United States Patent [19]

Hashimoto et al.

[11] 4,084,170
[45] Apr. 11, 1978

[54] FOCAL PLANE SHUTTER

[75] Inventors: Akihiko Hashimoto; Fuzio Enomoto, both of Hachioji, Japan

[73] Assignee: Olympus Optical Co., Ltd., Tokyo, Japan

[21] Appl. No.: 705,546

[22] Filed: Jul. 15, 1976

[30] Foreign Application Priority Data

| Jul. 22, 1975 | Japan | 50-89799 |
| Jul. 28, 1975 | Japan | 50-104930[U] |
| Jul. 28, 1975 | Japan | 50-104931[U] |
| Jul. 28, 1975 | Japan | 50-104932[U] |
| Sep. 18, 1975 | Japan | 50-128620[U] |

[51] Int. Cl.² .............................................. G03B 9/34
[52] U.S. Cl. .................................... 354/205; 354/244
[58] Field of Search ............... 354/205, 242, 243, 259, 354/241, 244

[56] References Cited

U.S. PATENT DOCUMENTS 3,913,117  10/1975  Endo et al. ..................... 354/205

FOREIGN PATENT DOCUMENTS 2,304,357  8/1973  Germany ........................... 354/205

*Primary Examiner*—Edna M. O'Connor
*Attorney, Agent, or Firm*—Ostrolenk, Faber, Gerb & Soffen

[57] ABSTRACT

A focal plane shutter includes a pair of pinions which are integrally provided on the winding drums of a first and a second screen, and a drive gear which is adapted for meshing engagement with the pinions and adapted to rotate to wind up the screens when a film winding operation is desired. The gear is provided with a hiatus of a circumferential length which releases the meshing engagement between the gear and the pinions, and which is normally located opposite to the pinions except for the screen winding operation. During the screen winding operation, the gear initially engages the pinion on the winding drum of the first screen and then engages the pinion on the winding drum of the second screen, thus assuring that the first screen runs first and then the second screen follows, completing a winding operation of both screens while they are in overlapping relationship.

4 Claims, 22 Drawing Figures

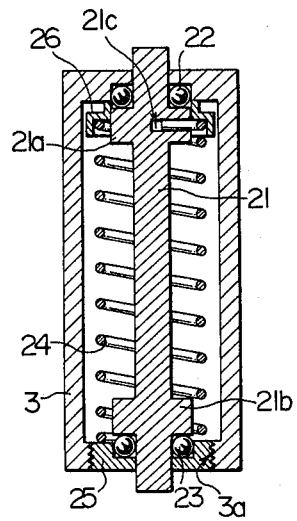
FIG.8
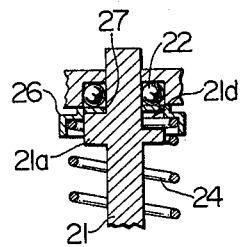
FIG.9
FIG.10
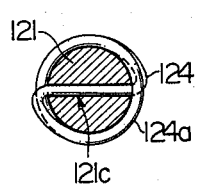
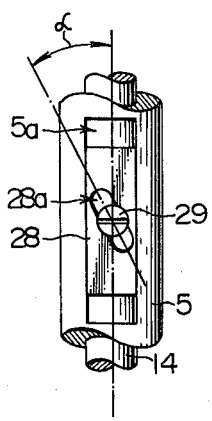
FIG.11
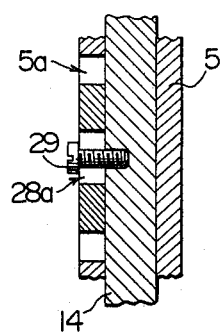
FIG.12
FIG.13
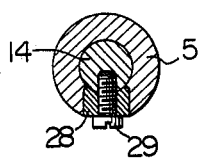

FOCAL PLANE SHUTTER

BACKGROUND OF THE INVENTION

The invention relates to a focal plane shutter, and more particularly to a focal plane shutter which is constructed to provide a time delay between the initiation of the winding of the first and the second screen thereof. More specifically, the invention relates to a focal plane shutter which provides a smooth shutter operation by an improved mounting of the screens on the winding or take-up drums, by controlling a uniform timing for the initiation of rotation of the winding drums when the winding operation is desired, or by controlling the operation of the winding drums.

In a conventional focal plane shutter which is used in a single lens reflex camera or advanced 35mm cameras, the winding drums associated with the first and the second screen are integrally provided with pinions, and a drive gear which is interlocked with a film winding operation is normally maintained in meshing engagement with both of the pinions associated with the respective winding drums. This results in a simultaneous winding of both screens upon charging the shutter, and if any slit is formed between the screens for some reason, there is no correction means therefor, resulting in both screens being wound while maintaining a slit therebetween to result in an exposure of the film, which is thus made useless. On the other hand, when the drive gear is normally in meshing engagement with both pinions, it is necessary to provide separately some means such as a one way clutch, for example, for disengaging the drive gear from the film winding mechanism during the shutter operation. This increases the overall size and the cost of the apparatus.

Several other considerations should be paid to the general arrangement of the focal plane shutter. Specifically, the first and the second screen of the shutter has its rear end secured to its winding drum, and unless the starting position of both screens is relatively adjusted in a proper manner, there may result a disturbance in a shutter speed during the shutter operation. When running the first and the second screen of the shutter, it is necessary to apply a smooth braking action toward the end of their running in order to avoid shocks which may occur at the termination of their running. On the other hand, it is desirable to avoid the application of the braking at the commencement of the running in order to assure a rapid actuation of the shutter, which may rather preferably be aided by application of a suitable amount of starting force. The provision of means which applies a braking or starting force in this manner usually requires a complex arrangement, which results in an increase in the cost.

SUMMARY OF THE INVENTION

It is a first object of the invention to provide a focal plane shutter which includes a drive gear having a hiatus for cooperation with a pair of pinions provided on the part of winding drums on which a first and second screen is disposed and wherein the drive gear is oriented such that normally, namely, except for the period of a shutter winding operation, the hiatus is located opposite to the pinions so as to interrupt the operative relationship therebetween but, when a shutter winding operation is initiated, the pinion on the winding drum associated with the first screen is initially brought into meshing engagement with the drive gear, followed by the pinion on the winding drum associated with the second screen, thereby assuring that the first screen precedes the second screen in its winding operation so as to achieve an overlapped winding of the screens.

With this arrangement, no slit occurs between the screens when the shutter winding operation is effected, completely avoiding various influences caused by such slit. Since the hiatus in the drive gear is normally located opposite to the pinions, there is no need for the provision of a clutch which is usually provided to interrupt the operative connection between the drive gear and the pinions.

It is a second object of the invention to provide a focal plane shutter of the type described above, further including projections and a drive claw on the pinions and the drive gear, respectively, which define their relative positions before the commencement of their meshing engagement, thereby preventing the pinions from assuming indeterminate positions when freed from the drive gear to cause an inaccurate shutter operation the next time it is operated.

The drive claw on the drive gear and projections on both pinions provide an automatic correction of any misalignment therebetween when the meshing engagement therebetween is to be initiated.

It is a third object of the invention to provide a focal plane shutter of the type first mentioned in which the starting position of both screens can be easily adjusted by determining the positional relationship between the respective winding drums and their shafts during their assembly, through the provision of a position adjusting member which is slidable lengthwise of the drum and a fastening member (set screw) which fits in an elongate skewed slot formed in the position adjusting member and threadably engages the shaft.

The position adjusting member is slidable lengthwise of the drum, and as it slides, it causes the drum to rotate relative to its associated shaft, thereby easily adjusting the relative position therebetween. In this manner, a fine adjustment of the starting position of the screens is achieved. The adjustment takes place continuously within an extent as permitted by the skewed elongate slot. By providing a plurality of position adjusting members which have slots of different skewing angles, the extent of adjustment may be selectively varied.

It is a fourth object of the invention to provide a focal plane shutter of the first mentioned type which incorporates torsion springs for providing an interlocked motion between the winding drums and a brake member, thereby facilitating smooth starting and braking of both screens.

The winding drums, the torsion springs and the brake member are arranged such that a starting force is applied to both screens at the commencement of running of the screens while a smooth braking action is applied to them toward the end of their running. This is achieved in a simple arrangement as will be further described later.

It is a fifth object of the invention to provide a focal plane shutter of the type mentioned in the first and fourth objects which additionally include a brake control member for connecting and disconnecting a brake assembly to or from the winding drums in response to a film winding operation so as to remove loads completely during the period from the commencement to the end of the shutter winding operation.

The removal of loads imposed by the brake assembly upon the shutter winding operation during the period from the commencement to the end of the winding operation permits a uniform force to be used throughout for both a shutter winding and a film winding operation. In addition, disconnection of the braking action at the commencement of the shutter winding operation completely avoids any remainder of the first and second screen which remains unwound on the take-up drums after both screens have started to run upon shutter release, thus avoiding any interference with the next succeeding winding operation.

BRIEF DESCRIPTION OF THE DRAWINGS

FIG. 8 is a cross section of a shutter winding drum;

FIGS. 9 and 10 are cross-sectional views, partly in side elevation and in top view, respectively, showing part of the shutter winding drum;

FIG. 11 is a fragmentary side elevation of the shutter winding drum;

FIGS. 12 and 13 are fragmentary longitudinal and transverse sections of the shutter winding drum;

DETAILED DESCRIPTION OF PREFERRED EMBODIMENT

Figure 1:
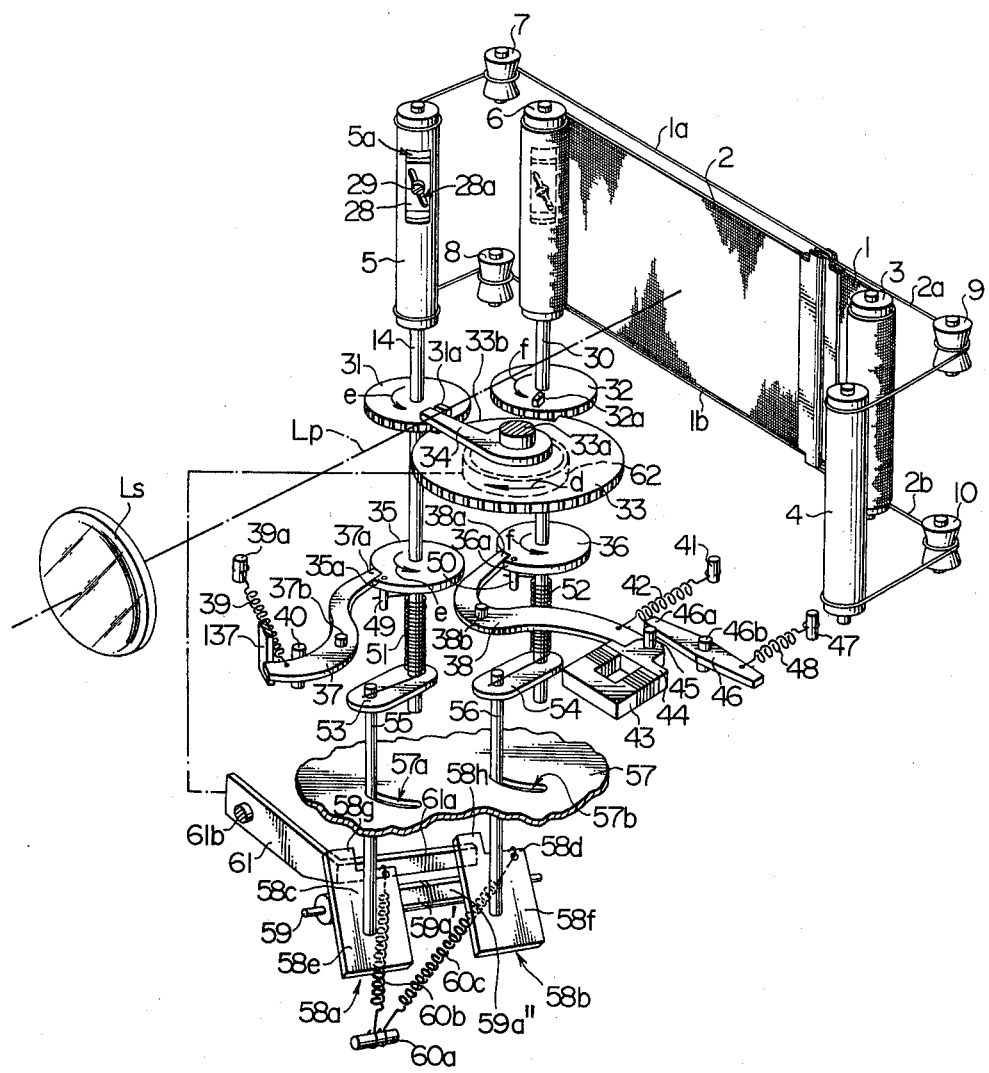
FIG. 1 is a perspective view of a focal plane shutter constructed in accordance with the invention.

Referring to FIG. 1, there are shown a first screen 1 and a second screen 2 of the shutter, both of which are formed of a metal film or a rubber lined fabric. Shown on the righthand side of the screens are a take-up drum 3 for the first screen and a take-up drum 4 for the second screen, while on the left-hand side are shown a winding drum 5 for the first screen and a winding drum 6 for the second screen. The right-hand end of the first screen 1 is directly wrapped around the take-up drum 3 while its left-hand end has a pair of strings 1a, 1b attached to its top and bottom ends, which extend around a pair of left-hand idle rollers 7, 8 to be secured and disposed on the winding drum 5. The right-hand end of the second screen 2 has a pair of strings 2a, 2b attached to the top and bottom ends thereof, which strings extend around a pair of right-hand idle rollers 9, 10 to be secured and disposed on the take-up drum 4. The left-hand portion of the second screen 2 is directly wrapped around the winding drum 6.

Figure 2:
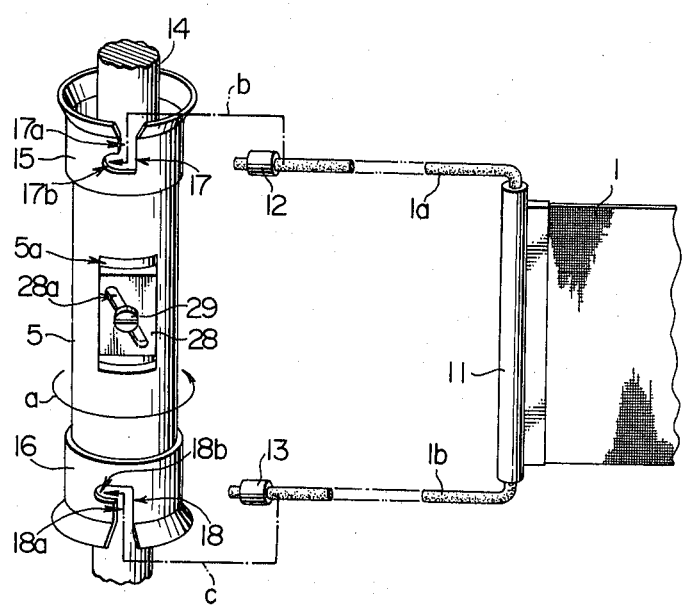
FIG. 2 is a perspective view showing the connection between a screen and a shutter winding drum.
Figure 3:
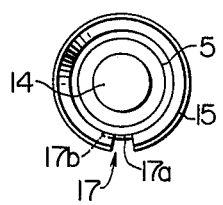
FIG. 3 is a top view of a shutter winding drum.
Figure 4:
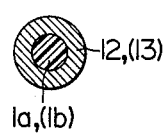
FIGS. 4 and 5 are cross-sectional views illustrating the relationship between the string attached to the shutter screen and the fastening member.
Figure 5:
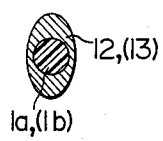
Figure 6:
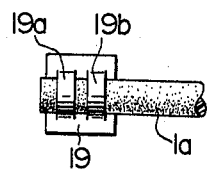
FIG. 6 is a plan view illustrating the relationship between the string and other fastening members.
Figure 7:
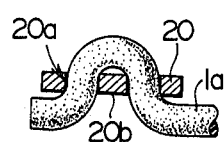
FIG. 7 is an elevational section illustrating the relationship between the string and another form of fastening member.

The strings 1a, 1b, 2a, 2b can be secured to the winding drums 5, 6 or the take-up drums 3, 4 by utilizing means as shown in FIGS. 2 to 7, which illustrate the manner of securement of the first screen 1 to its winding drum 5. Referring to FIG. 2, the pair of strings 1a, 1b associated with the first screen 1 have their right-hand ends secured to the left-hand end of the first screen 1 at the top and bottom thereof, by utilizing an attaching member 11. A pair of fastening members 12, 13 in the form of metal ferrules are passed over the left-hand end of the respective strings (see FIG. 4) and then crimped thereon (see FIG. 5). The opposite end portions of the winding drum 5 are formed as a pair of spools 15, 16 having a slightly increased diameter, and both spools are formed with a pair of notches 17, 18. Each of the notches 17, 18 comprises a notch portion 17a, 18a which extends from the respective end of the drum lengthwise toward the center thereof, and a second notch portion 17b, 18b which extends circumferentially from the inner end of the notch portions 17a, 18b, the notch portion 17b, 18b extending in the opposite direction from the direction of rotation a of the winding drum 5 as it is charged, or to the left, as viewed in FIG. 2. The pair of strings 1a, 1b are fastened to the winding drum 5 by initially placing the fastening members 12, 13 inside the spools 15, 16, with the free end of the string also located inside the spool, inserting the end portions of the strings which are contiguous with these fastening members into the lengthwise notch portions 17a, 18a, as indicated by phantom lines b, c, then moving the end portions of the strings into the circumferential notch portions 17b, 18b where they are pulled lengthwise outward to engage the fastening members 12, 13 with the inner edges of the notches 17, 18. FIG. 6 shows an alternate form of fastening member 19 which is again formed of a metal material, the member 19 including a pair of tunnel portions 19a, 19b which are formed by piercing of the material and through which the string 1a is passed. Subsequently, these tunnel portions are crimped onto the string. Still another form of fastening member 20 is shown in FIG. 7 where the member 20 is formed of a metal or plastic material and is provided with a pair of spaced openings 20a, 20b. The end of the string 1a is initially passed through one of the openings in one direction and then passed through the other opening in the opposite direction. In this manner, each of the remaining strings 1b, 2a, 2b can be connected to their associated take-up or winding drums.

The take-up drums 3, 4 associated with the first and second screens 1, 2 are contructed in a similar manner, and one of them, 3, is illustrated in FIGS. 8 and 9. As shown in these Figures, the drum 3 is loosely mounted on a stationary support shaft 21 by means of a pair of ball bearings 22, 23, and internally houses a coiled drive spring 24 which is disposed on the shaft 21 and which bears against a collar 21a and the bottom of the drum, respectively. The shaft is also formed with a lower collar 21b, and the ball bearings 22, 23 are disposed between these collars and the opposite ends of the drum 3, respectively. It will be noted that the bottom of the drum 3 is formed with an opening 3a which permits it to be mounted on the shaft 21, a threaded cover member 25 being threadably engaged with the thread formed in the opening 3a.

The upper collar 21a of the shaft 21 is formed with a detent opening 21c into which the upper end of the coiled spring 24 is inserted after winding it around the periphery of the collar 21a, thus securing this end of the spring 24. A dish-shaped retainer 26 is disposed over the spring 24. The lower end of the spring 24 is secured to the bottom of the drum 3 by conventional means. Referring to FIG. 10, it is noted that usual practice for securing an end of a coiled spring to a drum shaft has been to provide a shaft 121 with a diametrically extending hole 121c through which the end 124a of the spring is passed and then its free end portion wrapped around the shaft 121 through substantially one turn, for the purpose of anchoring it. It will be appreciated that the described arrangement shown in FIG. 8 is advantageous as compared with such conventional means in the ease of assembly and in avoiding any likelihood of impediment to the drum motion which may be caused by the free end of the spring extending to bear against the drum. FIG. 9 shows an alternative arrangement in which the opening 21c is replaced by a slit 21d formed in the collar 21a of the shaft 21 and which is covered by a disc-shaped retainer 27, with similar effect as mentioned above.

The winding drums 5 and 6 are similar in configuration, and the winding drum 5 associated with the first screen is illustrated in FIG. 2. As shown, it includes a support shaft 14. As is clearly shown in FIGS. 11 to 13, there is provided means which permits a simple adjustment of the relative position between the shaft 14 and the drum 5. Specifically, the drum 5 is formed with a lengthwise extending elongate slot 5a, into which is fitted a block-shaped adjusting member 28 of a length which permits its displacement along the length of the slot 5a. The adjusting member 28 is formed with a skewed elongate slot 28a which forms an angle of $\alpha$ with respect to the lengthwise direction thereof. A set screw 29 is loosely fitted into the slot 28a and threadably engages the shaft 14. By loosening the screw 29 and displacing the adjusting member 28 vertically within the slot 5a, the relative position between the shaft 14 and the drum 5 can be changed, thus allowing the starting position of the screen or a tension therein to be adjusted in an advantageous manner. By providing a plurality of adjusting members having different skew angles, the extent of adjustment can be selectively varied. The other winding drum 6 is similarly constructed.

Returning to FIG. 1, the shaft 14 of the winding drum 5 associated with the first screen, and a shaft 30 on which the winding drum 6 associated with the second screen is supported, both fixedly carry pinions 31, 32 on their lower portion, and disposed adjacent to these pinions is a drive gear 33 which is adapted to rotate through one revolution in the direction indicated by an arrow $d$ about its shaft 33a in response to a film winding operation. The drive gear 33 is provided with a hiatus 33b of a sufficient circumferential length to prevent the meshing engagement between the pinions 31, 32 and the gear 33 in a selected position thereof. Before the initiation of its rotation or before a film winding operation is initiated, the hiatus 33b is located opposite both pinions 31, 32. Various parts are shown in FIG. 1 before a film winding operation is initiated. When a film winding operation is initiated, the drive gear 33 rotates in the direction of the arrow $d$ to cause initially the pinion 31 on the winding drum 5 to rotate in the direction of an arrow $e$, and then causes the other pinion 32 to rotate in the direction indicated by an arrow $f$ after a time delay corresponding to the length of the hiatus 33b. Thus, the first screen 1 begins to be wound up earlier than the second screen 2, and such an advanced winding of the first screen 1 is effective to prevent any slit which may be formed between the screens to be completely closed when winding up both screens.

Figure 14:
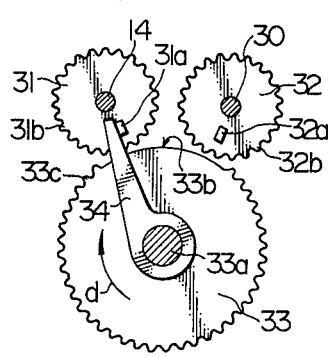
FIG. 14 is a schematic plan view of the drive gear and the pinions.

At portions adjacent to the drive gear 33 before the initiation of rotation, the respective pinions 31, 32 fixedly carry projections 31a, 32a, respectively, on their upper surface, and a drive claw 34 is fixedly mounted on the drive gear 33 so as to be selectively engageable with these projections 31a, 32a. As shown in FIG. 14, the free end of the drive claw 34 is located so that it assumes an advanced position, as viewed in the direction $d$ of rotation thereof, relative to the first tooth 33c which is the first one to engage the tooth on the pinion 31. It is thus assured that the claw 34 never fails to engage the respective projections 31a, 32a as the first tooth 33c meshes with the respective pinions 31, 32, thereby defining the position of these pinions at which they commence the meshing engagement with the drive gear 33. It will be seen that the first tooth 33c on the drive gear 33 will always mesh with a particular tooth, for example, teeth 31b, 32b, on the respective pinions 31, 32. In this manner, any angular misalignment of the pinions with respect to the drive gear can be simply and automatically compensated for by an adjusted position of the drive claw. This adjustment is achieved over an arc segment of the locus of the free end of the claw 34 which is delineated by intersection with the locus of the projections 31a, 32a. In the embodiment shown, the pinions 31, 32 are adapted to rotate through substantially two revolutions as the drive gear 33 rotates through one revolution to complete the winding up of the respective screens 1, 2. Below the pinions 31, 32, the shafts 14, 30 have rotation control cam discs 35, 36 fixedly mounted thereon, and each of the cam discs 35, 36 is formed with a shoulder 35a or 36a. A first screen detent lever 37, and a second screen detent lever 38 each have one end formed as a detent 37a and 38a, respectively, which is adapted to engage the respective shoulder 35a and 36a. The shoulders are shaped to be engaged by the detents when the cam discs rotate in the opposite direction from those indicated by arrows $e$ and $f$. The detent lever 37 is rotatably mounted on a pin 37b, and is biased to engage the cam disc 35 by a coiled spring 39 extending between the other end thereof and a stationary pin 39a. However, the extent of the resulting rotation is limited by a stop 40. The detent lever 38 is rotatably mounted on a pin 38b and is biased to move away from the cam disc 36 by another coiled spring 42 extending between the other end thereof and a stationary pin 41. The other end of the lever 38 carries a pin 45 on which an armature 44 of an electromagnet 43 is pivotally mounted. A detent control lever 46 is rotatably mounted on a pin 46b and has its one end 46a maintained in abutting relationship against the pin 45 by a coiled spring 48 which extends between the other end thereof and a stationary pin 47. It is to be noted that the resilience of the coiled spring 48 exceeds that of the coiled spring 42, so that the detent lever 38 is urged by the detent control lever 46 with a sufficient force to engage the cam disc 36 even when the electromagnet 43 is not energized. It will be appropriate to mention here that the shutter control mechanism comprising the cam discs, detent levers, detent control lever and solenoid may be replaced by any one of other known arrangements.

A pair of pins 49, 50 are fixedly mounted on the lower surface of the rotation control cam discs 35, 36, respectively, and are respectively engaged by the upper end of torsion springs 51, 52 which are disposed on the shafts 14, 30 at a position below the cam discs 35, 36. As will be understood from the subsequent description, the upper end of these torsion springs may alternatively engage suitable arm members fixedly mounted on the shafts 14, 30, rather than the cam discs 35, 36. Loosely fitted on the shafts 14, 30 at a position below the torsion springs 51, 52 are one end each of a pair of braking arm members 53, 54, the other end of which fixedly carries rods 55, 56. These rods extend through the respective arm members 53, 54, and the lower end of the torsion springs 51, 52 bear against the portions of the rods 55, 56 which extend above the arm members 53, 54. The portions of the rods 55, 56 which extend below the arm members 53, 54 loosely fit in a pair of elongate slots 57a, 57b which are formed in a bottom plate 57 and define circular arcs struck from the axes of the shafts 14, 30. These rods are shown as extending further downward.

Figure 15:
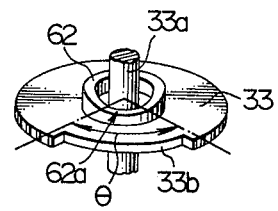
FIG. 15 is a perspective view of a cam on the drive gear.

Disposed below the bottom plate 57 are a pair of brake plates 58a, 58b, which are rockably mounted on a pair of tubes 59a', 59a" respectively, and the tubes 59a', 59a" are supported rotatably by a shaft 59. One end 58c, 58d of the respective brake plates is engaged at its underside by one end each of a pair of coiled springs 60b, 60c, which have their other end engaged with a stationary pin 60a, thus biasing the brake plates in a direction so that their braking areas 58e, 58f bear against the lower end of the rods 55, 56, respectively. Toward said one end, the brake plates 58a, 58b are formed with engaging portions 58g, 58h which are located opposite to one arm of an L-shaped brake control lever 61 which is pivotally mounted by means of a stud 61b which is provided on the other arm thereof. When the hiatus 33b in the drive gear 33 is located opposite to the pinions 31, 32, the lever 61 releases the brake plates so that their braking areas 58e, 58f bear against the lower end of the rods 55, 56, but in other positions of the drive gear, the lever 61 moves the braking areas 58e, 58f away from the rods 55, 56 by engaging the portions 58g, 58h of the brake plates 58a, 58b. Such an operation may be accomplished by interlocking the brake control lever 61 with an end cam 62 formed on the lower surface of the drive gear 33 so as to have a portion 62a thereof which corresponds to the hiatus 33b to be notched or depressed, as shown in FIG. 15. A detecting lever or like member may be used to sense the movement of the cam 62, and to cause a rocking motion of the brake control lever 61 to lock the brake plates 58a, 58b when it has detected the notch 62a in the end cam 62. Any other means may be utilized for providing an operative connection between the brake control lever 61 and the drive gear 33. In addition, the braking action afforded by the brake plates 58a, 58b may be replaced by any other suitable means. Preferably the notch 62a in the end cam 62 extends over an angle θ (see FIG. 15) which is slightly greater than the angle encompassed by the hiatus 33b.

The operation of the apparatus shown in FIG. 1 will be more fully described below with reference to FIGS. 16 to 22. In FIG. 1, both screens 1, 2 of the shutter are shown as having run in response to a shutter release operation and having been taken up on the take-up drums 3, 4. Under this condition, the residual resilience in the coiled spring 24 (see FIG. 8) acts through the winding drums 5, 6 to rotate the shafts 14, 30 associated with these drums in the opposite direction from those indicated by the arrows e, f. However, the resulting rotation of the shafts 14, 30 is prevented by the detent levers 37, 38 which engage and lock the shoulders in the rotation control cam discs 35, 36. At this time, the brake plates 58a, 58b are constrained by the brake control lever 61, thus freeing the rods 55, 56 on the brake arm members 53, 54. As a consequence, the rods 55, 56 bear against the left-hand edge of the arcuate slots 57a, 57b, respectively, under the resilience of the torsion springs 51, 52.

When a film winding operation takes place under this condition, the drive gear 33 responds thereto by rotating in the direction of the arrow d, sequentially rotating the pinions 31 and 32 in the directions of the arrows e, f. Since the pinions 31, 32 are driven with a time delay which is commensurate with the length of the hiatus in the drive gear 33, it is assured that the movement of the first screen 1 precedes the second screen 2 when they are wound up, so that the first and second screens 1, 2 maintain their overlapping relationship during such process. Since it is assured that the brake plates 58a, 58b free the rods 55, 56 on the arm members 53, 54 before a shutter winding operation is initiated to cause an abutment of the rotation control cam discs 35, 36 against the detent levers 37, 38, the rotation of the pinions 31, 32 always starts from these abutting positions. The cooperation of the claw 34 on the drive gear 33 with the projections 31a, 32a on the respective pinions 31, 32 assures a meshing engagement between the same teeth at the start of the winding operation, thereby preventing any disturbance to the shutter winding operation.

Figure 16:
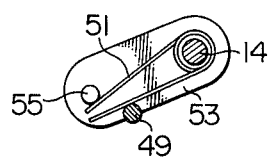
FIGS. 16 to 22 are schematic plan views of the brake member, torsion spring and rotation controlling cam disc during various stages of the operation.
Figure 17:
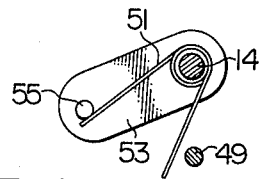

The pair of torsion springs 51, 52 extending between the rotation control cam discs 35, 36 and the arm members 53, 54 operate in the identical manner. FIG. 16 illustrates the operation of one of the torsion springs, 51. As shown, before the commencement of the shutter winding operation, the torsion spring 51 is sufficiently charged between the pin 49 on the cam disc 35 and the rod 55 on the arm member 53, by the action of the pin 49. As the shutter winding operation proceeds, the cam disc 35 rotates in the direction of the arrow e (see FIG. 1) to move away from the torsion spring 51, so that the latter is uncharged as shown in FIG. 17 and remains in this position until the pin 49 rotates through one revolution. During the rotation of the cam disc 35, the arm member 53 is operationally disconnected from the shaft 14.

Figure 18:
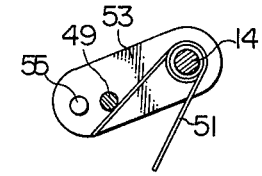
Figure 19:
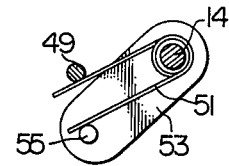
Figure 20:
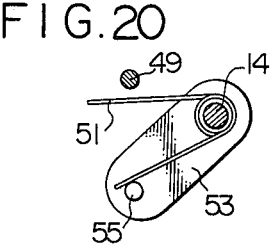
Figure 21:
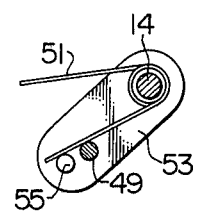

As the rotation control cam disc 35 completes its first revolution and enters its second revolution during the shutter winding operation, the pin 59 bears against the opposite end of the torsion spring 51 to move it angularly about the shaft 14, as illustrated in FIG. 18. Toward the end of the second revolution of the cam disc 35, the pin 49 moves the torsion spring 51 to thus move the rod 55 on the arm member 53 and rotates the arm member 53 until the rod 55 bears against the right-hand edge of the slot 57a (see FIG. 1). When the rod 55 on the arm member 53 bears against the right-hand edge of the slot 57a and the cam disc 35 completes its second revolution, the torsion spring 51 is charged to a certain degree by the action of the pin 49, illustrated in FIG. 19.

As mentioned previously, the braking action of the brake plates 58a, 58b upon the rods 55, 56 is released at the commencement of the shutter winding operation for allowing an adjustment in the starting position for the shutter winding operation. During the shutter winding operation, the brake plates 58a, 58b exert a braking action only upon the arm members 53, 54. Toward the end of the shutter winding operation, the braking action of the brake plates 58a, 58b is again released, whereby the drive gear 33 is freed from additional load, enabling a smooth shutter winding operation.

When both screens of the shutter are sufficiently wound up in interlocked relationship with a film winding operation, the coiled springs 24 (see FIG. 8) associated with the take-up drums 3, 4 are sufficiently charged to store the resilience which may be utilized for a shutter take-up operation. When a shutter release is effected under this condition, the detent lever 37 (see (FIG. 1) associated with the first screen is urged by a pushing lever 137 to be disengaged from the cam disc 35, instantaneously allowing a running of first screen 1 in order to open a light path Lp which extends through a picture taking lens Ls. In response to a shutter release, the detent control lever 46 is disengaged from the armature 44 of the electromagnet 43, and simultaneously an operation command is applied to the electromagnet. Thereupon, the electromagnet 43 replaces the locking function previously provided by the detent control lever 46 by attracting the armature 44 to hold the detent lever 38 in its locked position. The duration during which the electromagnet 43 remains energized is controlled in accordance with a value in an exposure meter, for example, and after a necessary exposure period has elapsed, it is deenergized. Upon the deenergization of the electromagnet 43, the armature 44 is freed, whereby the detent lever 38 associated with the second screen is disengaged from the rotation control cam disc 36 under the resilience of the coiled spring 42, thus allowing a running of the second screen 2 of the shutter to close the aforementioned light path.

The operation of the torsion spring 51 during the shutter operation is illustrated in FIGS. 19 to 22. As mentioned previously, FIG. 19 shows the condition at the end of the shutter charging operation. When a shutter release takes place under this condition, the shaft 14 rotates in the opposite direction from that indicated by the arrow e (see FIG. 1), causing the rotation control cam disc 35 to rotate in the same direction. At this time, the torsion spring 51 has a certain amount of resilience stored therein which tends to move the pin 49 away from the rod 55, thus aiding the rotation of the shaft 14 through the cam disc 35. This action of the torsion spring 51 is effective as a starting force when initiating the running of the first screen 1, thus contributing to providing a smooth running thereof.

As the cam disc 35 rotates, the pin 49 moves away from the torsion spring 51 (see FIG. 20), which remains in position together with the arm member 53. At this time, a braking action of the brake plates 58a, 58b is applied to the arm member 53 through the rod 55.

Figure 22:
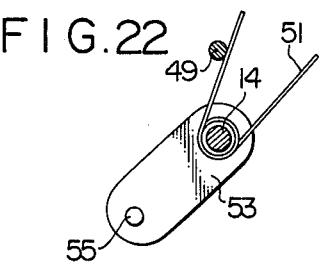

As the cam disc 35 completes its first revolution and enters its second revolution, the pin 49 bears against the opposite end of the torsion spring 51 (see FIG. 21), rotating it about shaft 14 as shown in FIG. 22. Toward the end of the second revolution of the cam disc 35 or toward the end of the running of the first screen 1, the pin 49 rotates and eventually urges the torsion spring 51 against the rod 55 on the arm member 53, thus providing a buffering action which gradually brakes the running of the first screen 1. When the torsion spring 51 is fully charged (see FIG. 16), the cam disc 35 and the arm member 53 are integrally coupled together for displacement through the torsion spring 51, thus undergoing a full influence of the braking action of the brake plates 58a, 58b to stop the running of the first screen 1. It should be understood that the other torsion spring 52 operates in an identical manner, providing a buffering and braking action upon the second screen 2.

When the operation of the first and second screens 1, 2 is terminated, the detent lever 37 locks the rotation control cam disc 35 and the detent control lever 46 bears against the armature 44 to cause the detent lever 38 to lock the rotation control cam disc 36, thus completing the entire operation of the shutter. At this time, the brake control lever 61 releases the braking action by the brake plates 58a, 58b so that if the cam discs 35, 36 happen to be braked to a stop before they achieve a locking engagement with the detent levers 37, 38, they are allowed to continue their rotation until they bear against their associated detent levers 37, 38, thus providing an automatic adjustment of position so that they are prepared to initiate a next shutter winding operation.

What is claimed is:

1. A focal plane shutter for opening and closing a light path extending through a picture taking lens of a camera; comprising a first shutter screen adapted to run in response to shutter release for opening the light path, a second shutter screen adapted to run at a given time period after the shutter release for closing the light path, a pair of shutter screen take-up drums respectively connected with one end of the first and second screens, resilient means charged in response to a film winding operation for urging the take-up drums in a direction to take up the shutter screens, a pair of shutter screen winding drums connected with the other end of each of the screens a pair of pinions operationally connected with the respective winding drums, a drive gear adapted to mesh with the pair of pinions during a film winding operation and arranged for rotation in response to a film winding operation to drive both pinions to rotate in a direction to wind up their associated winding drums, detent means associated with said first and second screens for locking both winding drums in their position which is reached when both screens are wound up on the winding drums and from which the rotation of the winding drums is initiated, means for releasing the winding drum associated with the first screen from the detent means in response to a shutter release operation to thereby permit a running of the first shutter screen, and detent control means for maintaining the detent means associated with the second shutter screen locked during a time period subsequent to a shutter release operation which depends on a necessary amount of exposure and for disengaging the winding drum associated with the second shutter screen from the detent means after said time period to allow a running of the second shutter screen, said drive gear being formed with a hiatus of a circumferential length which is sufficient to avoid the meshing engagement thereof with the pair of pinions, the hiatus being normally located opposite to the pair of pinions except during a shutter winding operation to disconnect the pinions from the drive gear, to drive gear being brought into meshing engagement with the pinions in a sequential manner such that the winding drum associated with the first shutter screen is driven first, followed by the winding drum associated with the second shutter screen with a time delay corresponding to the circumferential length of the hiatus in the drive gear;

said focal plane shutter further including a claw member on the drive gear and a projection on each pinion, the claw member engaging one of the projections before the meshing engagement between the drive gear and the corresponding pinion is initiated, thus defining a given starting position for the initiation of the meshing engagement between the drive gear and the corresponding pinion, the claw member subsequently engaging the other projection to define the starting position of the other pinion.

2. A focal plane shutter for opening and closing a light path extending through a picture taking lens of a camera; comprising a first shutter screen adapted to run in response to shutter release for opening the light path, a second shutter screen adapted to run at a given time period after the shutter release for closing the light path, a pair of shutter screen take-up drums respectively connected with one end of the first and second screens, resilient means charged in response to a film winding operation for urging the take-up drums in a direction to take up the shutter screens, a pair of shutter screen winding drums connected with the other end of each of the screens a pair of pinions operationally connected with the respective winding drums, a drive gear adapted to mesh with the pair of pinions during a film winding operation and arranged for rotation in response to a film winding operation to drive the both pinions to rotate in a direction to wind up their associated both winding drums, detent means associated with said first and second screens for locking both winding drums in their position which is reached when both screens are wound up on the winding drums and from which the rotation of the winding is initiated, means for releasing the winding drum associated with the first screen from the detent means in response to a shutter release operation to thereby permit a running of the first shutter screen, and detent control means for maintaining the detent means associated with the second shutter screen locked during a time period subsequent to a shutter release operation which depends on a necessary amount of exposure and for disengaging the winding drum associated with the second shutter screen from the detent means after said time period to allow a running of the second shutter screen, said drive gear being formed with a hiatus of a circumferential length which is sufficient to avoid the meshing engagement thereof with the pair of pinions, the hiatus being normally located opposite to the pair of pinions except during a shutter winding operation to disconnect the pinions from the drive gear, the drive gear being brought into meshing engagement with the pinions in a sequential manner such that the winding drum associated with the first shutter screen is driven first, followed by the winding drum associated with the second shutter screen with a time delay corresponding to the circumferential length of the hiatus in the drive gear;

said focal plane shutter further including a braking arm member rotatably mounted on the support shaft of each of the winding drums, a torsion spring disposed on the shaft and having its opposite ends engageable with a pin associated with the winding drum and one end of the arm member, and brake means for braking the arm member toward the end of running of the associated shutter screen.

3. A focal plane shutter according to claim 2 in which the brake means comprises a braked rod operatively connected with the associated winding drum, a brake plate bearing against the rod for applying a braking action thereto, a cam which is driven in accordance with a film winding operation, and a brake control lever controlled by the cam for moving the brake plate away from the braked rod during the period from the commencement to the end of the film winding operation.

4. A focal plane shutter for opening and closing a light path extending through a picture taking lens of a camera; comprising a first shutter screen adapted to run in response to shutter release for opening the light path, a second shutter screen adapted to run at a given time period after the shutter release for closing the light path, a pair of shutter screen take-up drums respectively connected with one end of the first and second screens, resilient means charged in response to a film winding operation for urging the take-up drums in a direction to take up the shutter screens, a pair of shutter screen winding drums connected with the other end of each of the screens a pair of pinions operationally connected with the respective winding drums, a drive gear adapted to mesh with the pair of pinions during a film winding operation and arranged for rotation in response to a film winding operation to drive both pinions to rotate in a direction to wind up their associated winding drums, detent means associated with said first and second screens for locking both winding drums in their position which is reached when both screens are wound up on the winding drums and from which the rotation of the winding drums is initiated, means for releasing the winding drum associated with the first screen from the detent means in response to a shutter release operation to thereby permit a running of the first shutter screen, and detent control means for maintaining the detent means associated with the second shutter screen locked during a time period subsequent to a shutter release operation which depends on a necessary amount of exposure and for disengaging the winding drum associated with the second shutter screen from the detent means after said time period to allow a running of the second shutter screen, said drive gear being formed with a hiatus of a circumferential length which is sufficient to avoid the meshing engagement thereof with the pair of pinions, the hiatus being normally located opposite to the pair of pinions except during a shutter winding operation to disconnect the pinions from the drive gear, the drive gear being brought into meshing engagement with the pinions in a sequential manner such that the winding drum associated with the first shutter screen is driven first, followed by the winding drum associated with the second shutter screen with a time delay corresponding to the circumferential length of the hiatus in the drive gear;

means for driving said winding drums, and means for adjusting the shutter screens with respect to said winding drums comprising a position adjusting member for each winding drum; an elongated slot formed in and extending lengthwise of each of the winding drums, the position adjusting member for each drum being slidably fitted into said elongated slot;

a skewed elongated slot formed in said position adjusting member; a threaded screw fitted into said skewed elongated slot;

a support shaft for each winding drum;

said threaded screw threadably engaging the associated support shaft for the particular winding drum;

a displacement of the position adjusting member within the slot in the said winding drum when the said screw if loosened effecting an adjustment of the relative position between the winding drum and its associated support shaft and the mounting position of the respective shutter means; said adjusted position being maintained by subsequently tightening said screw.

* * * * *